(12) United States Patent
Chang et al.

(10) Patent No.: US 8,300,920 B2
(45) Date of Patent: Oct. 30, 2012

(54) SYSTEM AND METHOD FOR MEASURING FORM AND POSITION TOLERANCES OF AN OBJECT

(75) Inventors: Chih-Kuang Chang, Taipei Hsien (TW); Xin-Yuan Wu, Shenzhen (CN); Min Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 512 days.

(21) Appl. No.: 12/564,730

(22) Filed: Sep. 22, 2009

(65) Prior Publication Data

US 2010/0272346 A1 Oct. 28, 2010

(30) Foreign Application Priority Data

Apr. 25, 2009 (CN) .......................... 2009 1 0301833

(51) Int. Cl.
*G06K 9/00* (2006.01)

(52) U.S. Cl. ........ 382/141; 382/154; 345/419; 345/420; 345/423; 345/424

(58) Field of Classification Search .................. 382/141, 382/154; 345/419, 420, 423
See application file for complete search history.

(56) References Cited

U.S. PATENT DOCUMENTS

| | | | |
|---|---|---|---|
| 6,392,647 B1 * | 5/2002 | Migdal et al. ................. | 345/423 |
| 2002/0158870 A1 * | 10/2002 | Brunkhart et al. ............ | 345/424 |
| 2005/0099637 A1 * | 5/2005 | Kacyra et al. ................. | 356/601 |
| 2008/0228449 A1 * | 9/2008 | Birtwistle et al. ............... | 703/1 |

* cited by examiner

*Primary Examiner* — Tarifur Chowdhury
*Assistant Examiner* — Isiaka Akanbi
(74) *Attorney, Agent, or Firm* — Altis Law Group, Inc.

(57) ABSTRACT

A method for measuring form and position tolerances of an object receives a preselected feature element to be fitted from an image of a measured object, obtains a reference feature element from an image of a reference object corresponding to the measured object. The method further fits a feature element corresponding to the preselected feature element so as to obtain a fitted feature element, and calculates form and position tolerances between the fitted feature element and the reference feature element thereby generating the form and position tolerances of the measured object.

20 Claims, 6 Drawing Sheets

SYSTEM AND METHOD FOR MEASURING FORM AND POSITION TOLERANCES OF AN OBJECT

BACKGROUND

1. Technical Field

Embodiments of the present disclosure relate to measurement technology, and particularly to a system and method for measuring form and position tolerances of an object.

2. Description of Related Art

Measurement is an important phase in the manufacturing process and is closely interrelated to product quality. Currently, the form and position tolerances of objects are measured manually. In recent years, point cloud obtaining devices have been used to obtain point clouds of an object by scanning a large number of points on a surface of the object, processing the point clouds, and subsequently extracting boundary elements including boundary points and boundary characteristics of the object, in order to form a profile image of the object. Therefore, prompt and accurate measurement of form and position tolerances using the point clouds is desirable.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
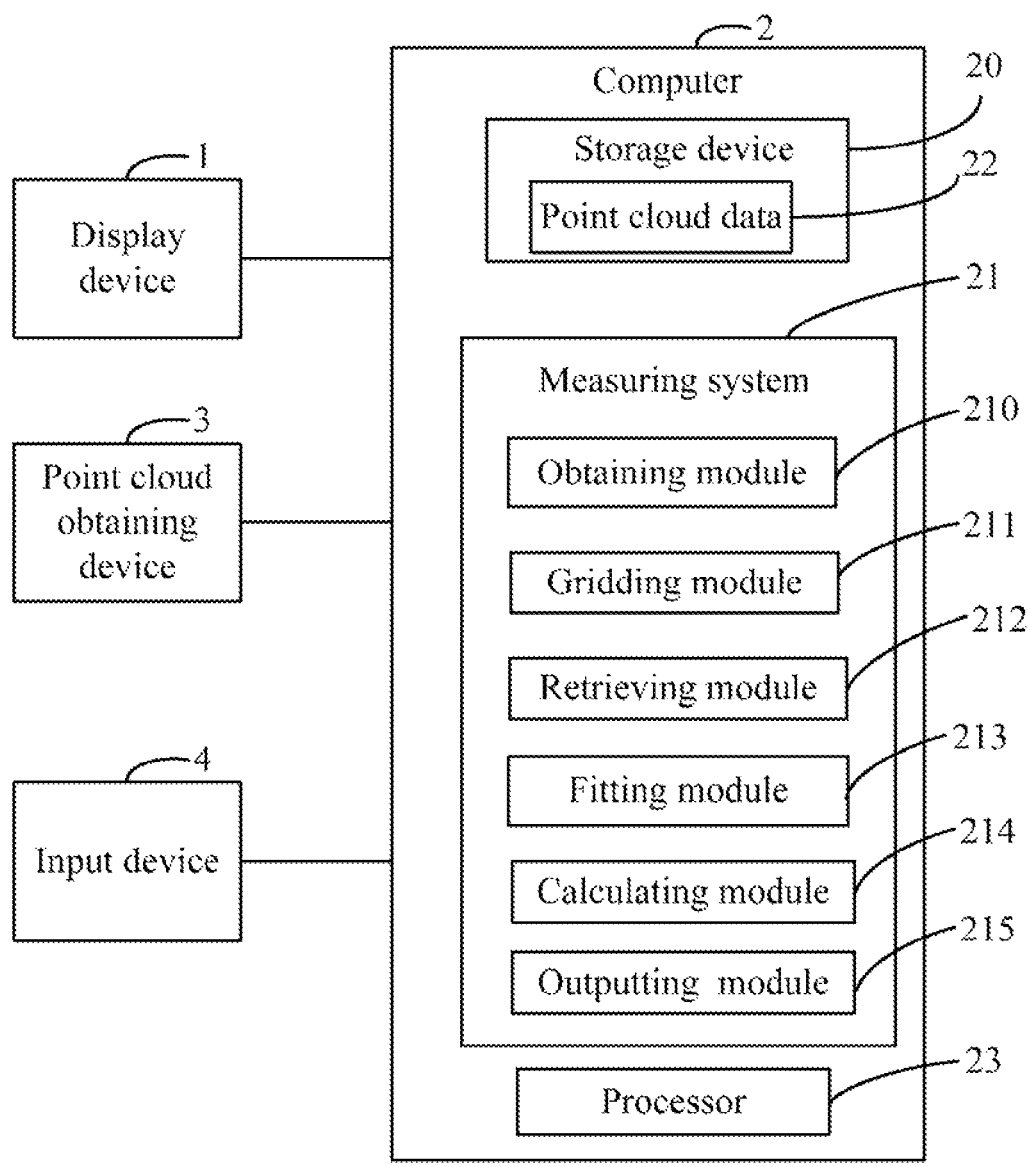
FIG. 1 is a block diagram of one embodiment of a computer comprising a system for measuring form and position tolerances of an object.
Figure 2:
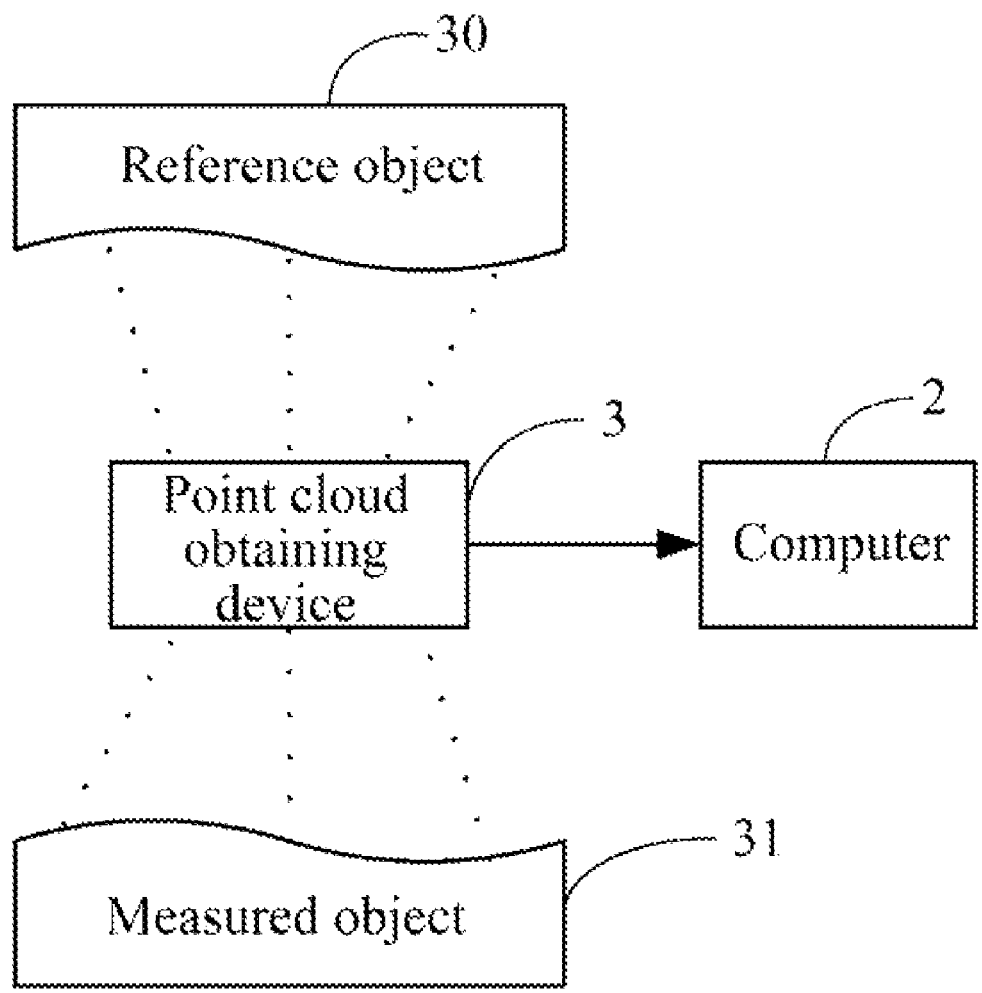
FIG. 2 is a schematic diagram of one embodiment of measurement of form and position tolerances of an object as implemented by the system of FIG. 1.

FIG. 1 is a block diagram of one embodiment of a computer 2 comprising a measuring system 21. Referring to FIG. 2, the measuring system 21 may be used to measure form and position tolerances of a measured object 31 by selecting a feature element to be measured from an image of the measured object 31, and obtaining a reference feature element from an image of a reference object 30 corresponding to the measured object 31. A feature element corresponding to the selected feature element is fitted so as to obtain a fitted feature element, form and position tolerances between the fitted feature element and the reference feature element thereby are calculated to generate the form and position tolerances of the measured object 31. A detailed description will be given in the following paragraphs.

In one embodiment, the computer 2 is electronically connected to a display device 1, a point cloud obtaining device 3, and an input device 4. Depending on the embodiment, the display device 1 may be a liquid crystal display (LCD) or a cathode ray tube (CRT) display, for example.

The computer 2 further includes a storage device 20 for storing information, such as point cloud data 22. In one embodiment, the point cloud data 22 may include coordinates of each point in the point cloud, an identification (ID) of each point, and a total number of points in the point cloud.

The input device 4 provides manual selection of a feature element from the image of the measured object 31. In one embodiment, the input device 4 may be a keyboard, and the measured object 31 may be a cover of a mobile phone.

In one embodiment, the measuring system 21 includes an obtaining module 210, a gridding module 211, a retrieving module 212, a fitting module 213, a calculating module 214, and an outputting module 215. In one embodiment, the modules 210-215 comprise one or more computerized instructions that are stored in the storage device 20. A processor 23 of the computer 2 executes the computerized instructions to implement one or more operations of the computer 2.

The obtaining module 210 receives an image of the measured object 31 and a preselected feature element from the image of the measured object 31. In one embodiment, the feature element may be a line, a plane, a circle, a cylinder, or a sphere, but the disclosure is not limited thereto.

The gridding module 211 divides the image of the measured object 31 into a plurality of triangular grids, so as to obtain point clouds of the image of the measured object 31.

The obtaining module 210 further receives a reference feature element selected from an image of the reference object 30 corresponding to the measured object 31.

Figure 4:
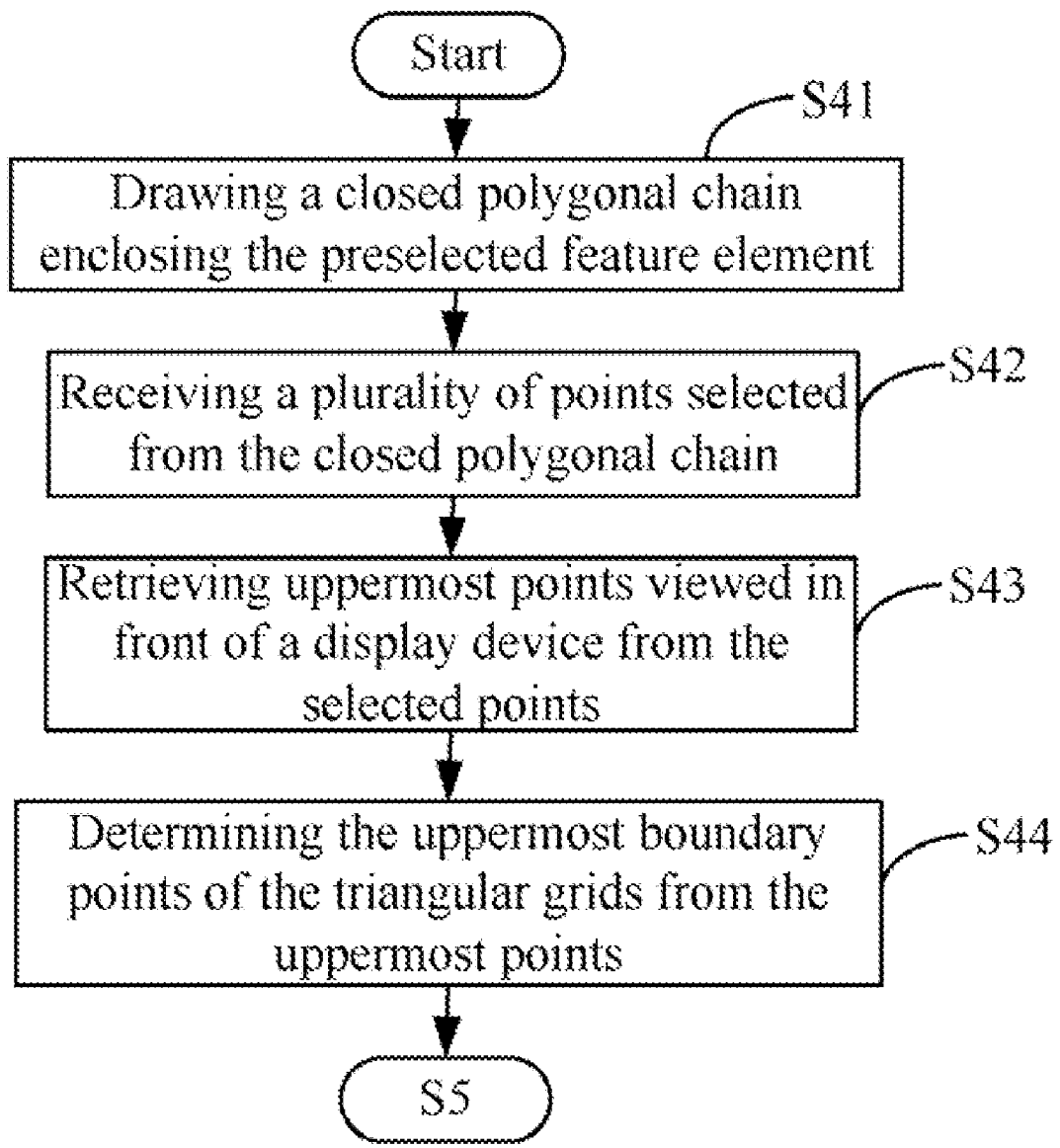
FIG. 4 is a detailed flowchart of one embodiment of block S4 in FIG. 3.

The retrieving module 212 retrieves uppermost boundary points from the triangular grids of the image of the measured object 31. A detailed description is shown in FIG. 4.

Figure 5:
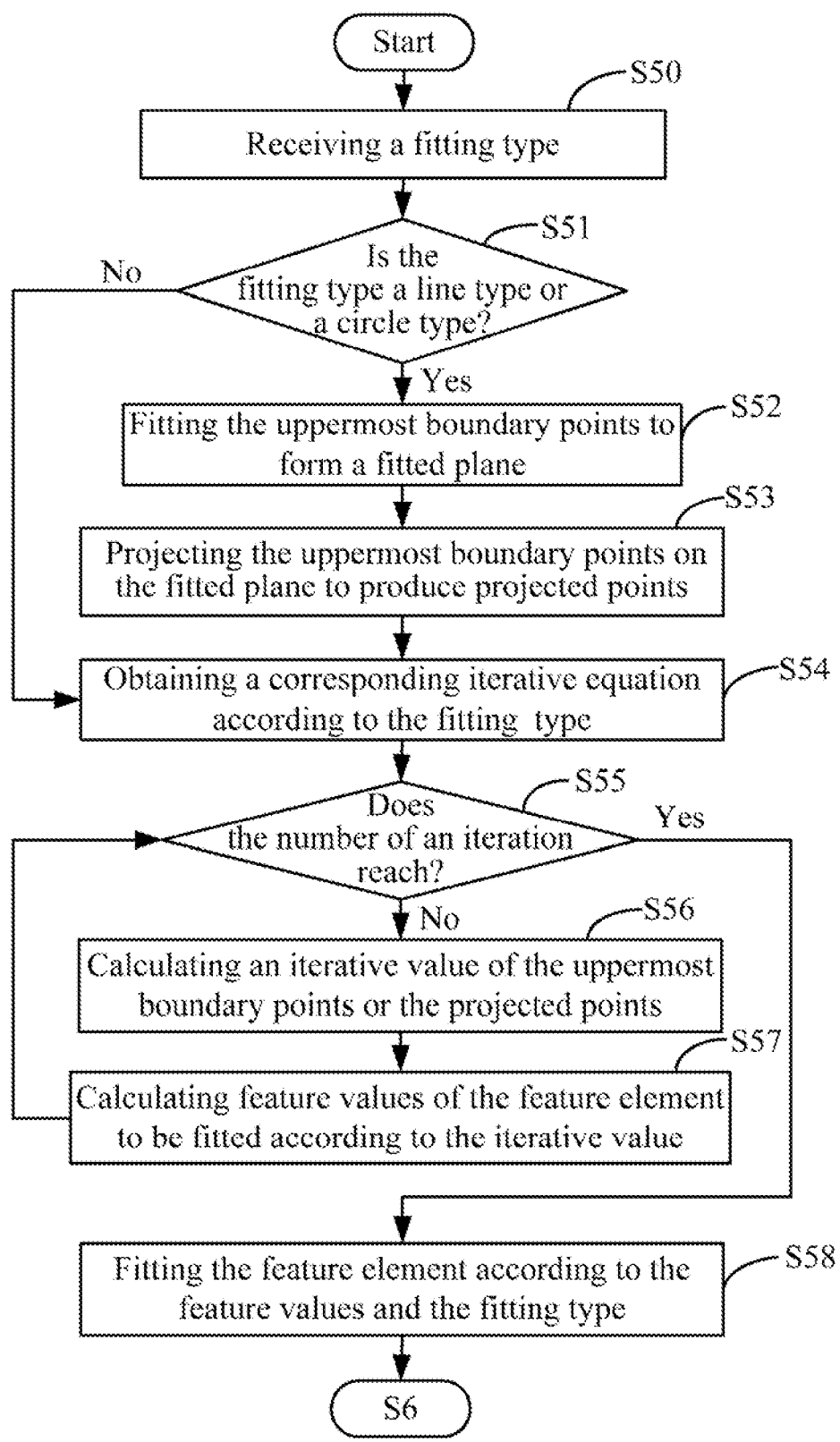
FIG. 5 is a detailed flowchart of one embodiment of block S5 in FIG. 3.
Figure 6:
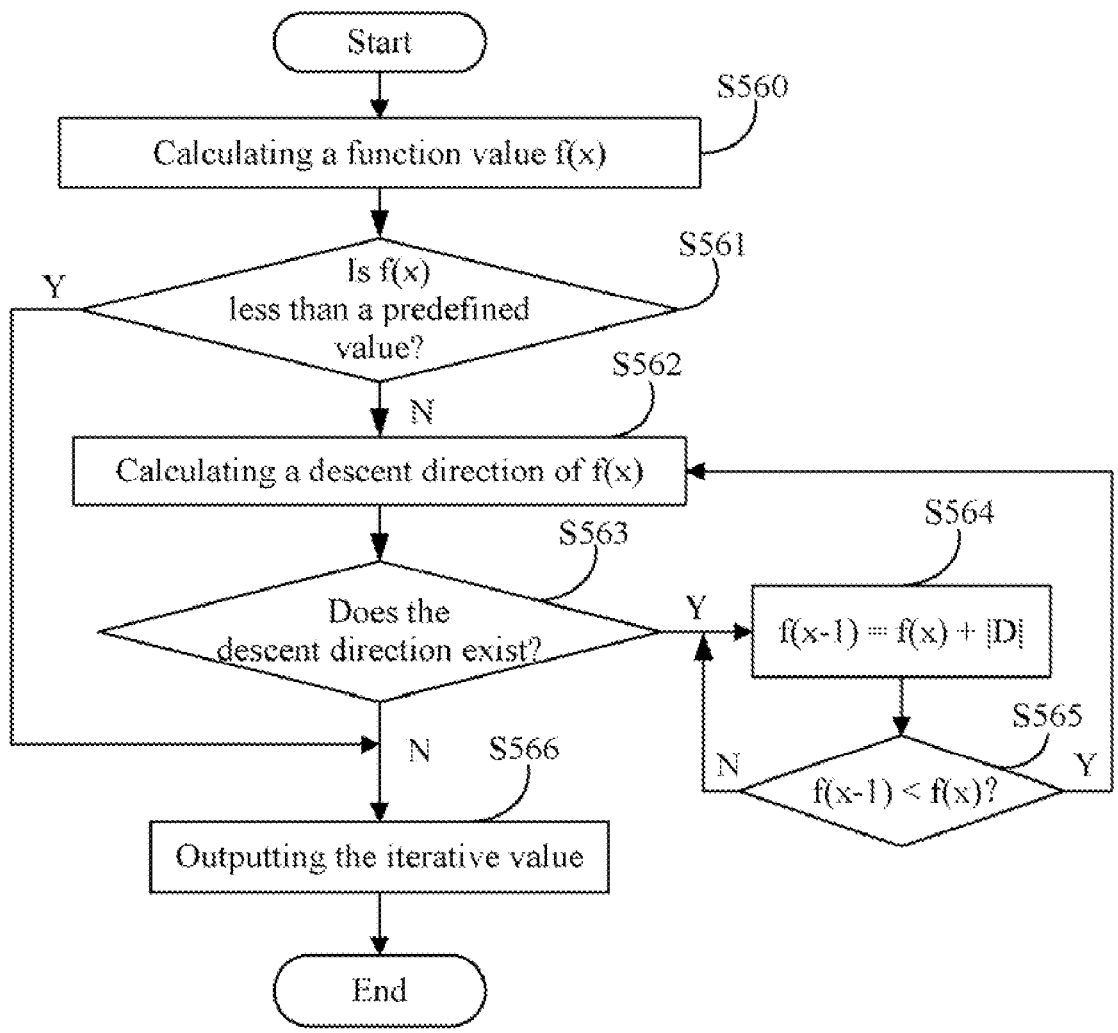
FIG. 6 is a detailed flowchart of one embodiment of block S56 in FIG. 5.

The fitting module 213 fits the retrieved uppermost boundary points to a feature element using an iterative method. In one embodiment, the iterative method may be the quasi-Newton iterative method. A detailed description is shown in FIG. 5 and FIG. 6.

The calculating module 214 calculates form and position tolerances between the fitted feature element and the reference feature element. In one embodiment, the form tolerances may include a straight tolerance, a flat tolerance, a circular tolerance, a cylindrical tolerance, a line profile tolerance, and a surface profile tolerance. The position tolerances may include a parallel tolerance, a perpendicular tolerance, an angular tolerance, a concentric tolerance, a symmetric tolerance, and a deviant tolerance.

The straight tolerance is a sum of distances between each point of a fitted line and a reference line in the image of the reference object 30. The flat tolerance is a sum of distances between each point of a fitted plane and a reference plane in the image of the reference object 30. The circular tolerance is a sum of distances between each point of a fitted circle and a reference circle in the image of the reference object 30. The cylindrical tolerance is a sum of distances between each point of a fitted cylinder and a reference cylinder in the image of the reference object 30.

The line profile tolerance is a tolerance between a profile of a fitted line and a profile of a reference line in the image of the reference object 30. The profile of a surface tolerance is a tolerance between a profile of a fitted plane and a profile of a reference plane in the image of the reference object 30. The parallel tolerance is a difference value between a maximum distance and a minimum distance of a fitted plane and a reference plane in the image of the reference object 30.

One example of a formula to calculate the perpendicular tolerance is as follows:

$$f = \left|(M_1 - M_2) + \frac{d_1 - d_2}{2}\right| * \frac{L_1}{L_2},$$

where "$L_1$" represents a length of a reference feature element, "$L_2$" represents a length of the fitted feature element, "$M_1$" represents a distance value between a first point of the fitted feature element and a coordinate system in the display device 1, "$d_1$" represents a shaft diameter of the fitted feature element at the first point, "$M_2$" represents a distance value between a second point of the fitted feature element and a coordinate system in the display device 1, "$d_2$" represents a shaft diameter of the fitted feature element at the second point. Thus, one example of a formula to calculate the angular tolerance is as follows:

$$f = \frac{L_1}{L_2}.$$

One example of a formula to calculate the concentric tolerance is as follows: $f=2\sqrt{(x_1-x_2)^2+(y_1-y_2)^2}$, where "$(x_1,y_1)$" represents coordinate values of a center point of the fitted feature element, "$(x_2, y_2)$" represents coordinate values of a center point of the reference feature element.

One example of a formula to calculate the symmetric tolerance is as follows: $f=|a_1-a_2|_{max}$, where "$|a_1-a_2|_{max}$" represents a maximum distance between two max symmetric sides of the fitted feature element.

One example of a formula to calculate the deviant tolerance is as follows: $f=2\sqrt{f_x^2+f_y^2}$, where "$f_x$" represents a deviation value between an X-axis coordinate value of a center point of the fitted feature element and an X-axis coordinate value of a center point of the reference feature element, "$f_y$" represents a deviation value between a Y-axis coordinate value of the center point of the fitted feature element and a Y-axis coordinate value of the center point of the reference feature element.

The outputting module 215 outputs an analysis report to show the form and position tolerances on the display device 1.

FIG. 4 is a flowchart of one embodiment of a method for measuring form and position tolerances of an object. Depending on the embodiment, additional blocks may be added, others removed, and the ordering of the blocks may be changed.

In block S1, the obtaining module 210 receives an image of the measured object 31 and a preselected feature element from the image of the measured object 31.

In block S2, the gridding module 211 divides the image of the measured object 31 into a plurality of triangular grids, so as to obtain point clouds of the image of the measured object 31.

In block S3, the obtaining module 210 further receives a reference feature element selected from an image of the reference object 30 corresponding to the measured object 31.

In block S4, the retrieving module 212 retrieves uppermost boundary points from the triangular grids of the image of the measured object 31. A detailed description is shown in FIG. 4.

In block S5, the fitting module 213 fits the retrieved uppermost boundary points to a feature element using an iterative method. In one embodiment, the iterative method may be the quasi-Newton iterative method. A detailed description is shown in FIG. 5 and FIG. 6.

In block S6, the calculating module 214 calculates form and position tolerances between the fitted feature element and the reference feature element.

In block S7, the outputting module 215 outputs an analysis report to show the form and position tolerances on the display device 1.

Figure 3:
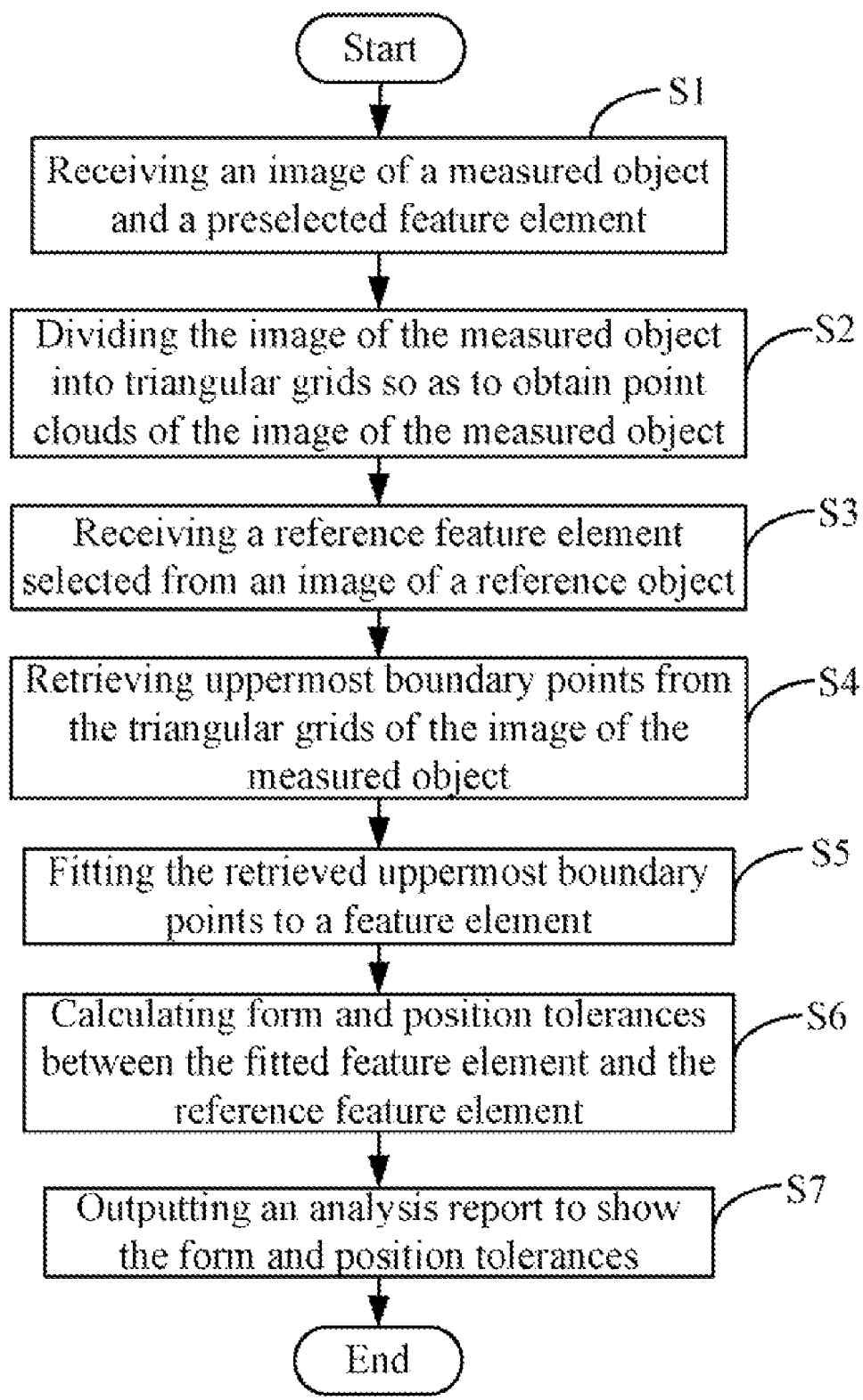
FIG. 3 is a flowchart of one embodiment of a method for measuring form and position tolerances of an object.

FIG. 4 is a detailed flowchart of one embodiment of block S4 in FIG. 3.

In block S41, the retrieving module 212 draws a closed polygonal chain onto the triangular grids so as to enclose the preselected feature element.

In block S42, the retrieving module 212 receives a plurality of points selected from the closed polygonal chain.

In block S43, the retrieving module 212 retrieves uppermost points viewed in front of the display device 1 from the selected points.

In block S44, the retrieving module 212 determines the uppermost boundary points of the triangular grids by comparing the uppermost points with the boundary points. In one embodiment, if the coordinates of the uppermost point are the same as one of the boundary points, the uppermost point is determined as one of the uppermost boundary points.

FIG. 5 is a detailed flowchart of one embodiment of block S5 in FIG. 3. Depending on the embodiment, additional blocks may be added, others removed, and the ordering of the blocks may be changed.

In block S50, the fitting module 213 receives a fitting type of the preselected feature element. In one embodiment, the fitting type may be a line type, a plane type, a circle type, a cylinder type, or a sphere type.

In block S51, the fitting module 213 determines if the fitting type is a line type or a circle type. Block S52 is implemented if the fitting type is a line type or a circle type, or block S54 is implemented if the fitting type is not a line type or a circle type.

In block S52, the fitting module 213 fits the uppermost boundary points to form a fitted plane.

In block S53, the fitting module 213 projects the uppermost boundary points on the fitted plane to produce projected points.

In block S54, the fitting module 213 obtains a corresponding iterative equation according to the fitting type. In one embodiment, if the fitting type is a line type, one example of the corresponding iterative equation is as follows:

$$f(x) = \min\sqrt{\frac{\sum_{i=1}^{n}\left(\sqrt{(x_i - x_0)^2 + (y_i - y_0)^2 + (z_i - z_0)^2} * \sin(\alpha)\right)^2}{n}}$$

If the fitting type is a circle type, one example of the corresponding iterative equation is as follows:

$$f(x) = \min\sqrt{\frac{\sum_{i=1}^{n}\left(\sqrt{(x_i - x)^2 + (y_i - y)^2 + (z_i - z)^2} - R\right)^2}{n}}$$

If the fitting type is a plane type, one example of the corresponding iterative equation is as follows:

$$f(x) = \min\sqrt{\frac{\sum_{i=1}^{n}\left(\frac{(Ax_i + By_i + Cz_i + D)}{\sqrt{A^2 + B^2 + C^2}}\right)^2}{n}}$$

If the fitting type is a cylinder type, one example of the corresponding iterative equation is as follows:

$$f(x) = \min\sqrt{\frac{\sum_{i=1}^{n}\left(\sqrt{(x_i - x_0)^2 + (y_i - y_0)^2 + (z_i - z_0)^2} * \sin(\alpha) - R\right)^2}{n}}$$

If the fitting type is sphere type, one example of the corresponding iterative equation is as follows:

$$f(x) = \min\sqrt{\frac{\sum_{i=1}^{n}\left(\sqrt{(x_i - x_0)^2 + (y_i - y_0)^2 + (z_i - z_0)^2} - R\right)^2}{n}}$$

In block S55, the fitting module 213 determines if the number of an iteration N reaches a preset integer (e.g. N=3). Block S58 is implemented if the number of the iteration reaches the preset integer, or block S56 is implemented if the number of the iteration does not reach the preset integer.

In block S56, the fitting module 213 obtains the number of points used in a current iteration, and calculates an iterative value of the uppermost boundary points or the projected points according to original iterative parameters and the corresponding iterative equation. In one embodiment, if N=3, the number of points used in a first iteration may be the number of the uppermost boundary points or the projected points multiplied by 10%, the number of points used in a second iteration may be the number of the uppermost boundary points or the projected points multiplied by 50%, and the number of points used in a third iteration is the number of the uppermost boundary points or the projected points. The iterative value is a minimum distance between the uppermost boundary points or the projected points and the feature element to be fitted. In one embodiment, as the iterative value approaches zero, accuracy of the feature element is improved. A method for calculating the iterative value will be described below referring to FIG. 6.

In one embodiment, the original iterative parameters are obtained using the least square method. If the fitting type is a line type, the original iterative parameters may include coordinates of a start point and an end point. If the fitting type is a circle type, the original iterative parameters may include coordinates of the center. If the fitting type is a sphere type, the original iterative parameters may include coordinates of the center. If the fitting type is a cylinder type, the original iterative parameters may include coordinates of a start point and an end point of the central axis. If the fitting type is a plane type, the original iterative parameters may include dimensional position and a normal vector.

In block S57, the module 213 calculates feature values of the feature element to be fitted according to the iterative value, then the procedure returns to block S55. For example, if the feature element to be fitted is a line, the feature values may include coordinates of a start point and an end point.

In block S58, the module 213 fits the feature element according to the feature values and the fitting type.

FIG. 6 is a detailed flowchart of one embodiment of block S57 in FIG. 5. Depending on the embodiment, additional blocks may be added, others removed, and the ordering of the blocks may be changed.

In block S560, the fitting module 213 calculates a function value f(x) of the iterative equation in block S54.

In block S561, the fitting module 213 determines if f(x) is less than a predefined value. Block S566 is implemented if f(x) is less than the predefined value, or block S562 is implemented if f(x) is greater than or equal to the predefined value.

In block S562, the fitting module 213 calculates a descent direction of f(x).

It may be understood that the descent direction of f(x) is a direction toward which the value of f(x) decreases.

In block S563, the fitting module 213 determines if the descent direction of f(x) exists. Block S566 is implemented if the descent direction of f(x) does not exist, or block S564 is implemented if the descent direction of f(x) exists.

In block S564, the fitting module 213 moves the uppermost boundary points or the projected points by a step D along the descent direction, and calculates a new function value f(x−1) of the iterative equation after the movement of the uppermost boundary points or the projected points, where f(x−1)=f(x)+|D|.

In block S565, the fitting module 213 determines if f(x−1) is less than f(x). The procedure returns to block S562 if f(x−1) is less than f(x), or the procedure returns to block S564 if f(x−1) is greater than or equal to f(x), and f(x) is replaced by the new function value f(x−1).

In block S566, the fitting module 213 outputs the iterative value, where the iterative value is the function value f(x).

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for measuring form and position tolerances of an object, the method comprising:
   (a) receiving an image of a measured object and a preselected feature element to be fitted from the image stored in a storage device;
   (b) dividing the image of the measured object into a plurality of triangular grids, so as to obtain point clouds of the image of the measured object;
   (c) receiving a reference feature element selected from an image of a reference object corresponding to the measured object;
   (d) retrieving uppermost boundary points from the plurality of triangular grids;
   (e) fitting the retrieved uppermost boundary points to a feature element;
   (f) calculating form and position tolerances between the fitted feature element and the reference feature element; and
   (g) outputting an analysis report to show the form and position tolerances on a display device.

2. The method according to claim 1, wherein retrieving uppermost boundary points from the triangular grids of the image of the measured object comprises:
- (d1) drawing a closed polygonal chain onto the triangular grids so as to enclose the preselected feature element;
- (d2) obtaining a plurality of points selected from the closed polygonal chain;
- (d3) retrieving uppermost points viewed in front of the display device from the selected points; and
- (d4) determining the uppermost boundary points of the triangular grids by comparing the uppermost points with the boundary points.

3. The method according to claim 2, wherein the step (d4) comprises: determining the uppermost point as one of the uppermost boundary points upon the condition that the coordinates of the uppermost point are the same as one of the boundary points.

4. The method according to claim 1, wherein fitting the retrieved uppermost boundary points to a feature element comprises:
- (e0) receiving a fitting type of the preselected feature element;
- (e1) determining if the fitting type is a line type or a circle type, and the procedure going to block (e2) if the fitting type is a line type or a circle type, or the procedure going directly to block (e4) if the fitting type is not a line type or a circle type;
- (e2) fitting the uppermost boundary points to form a fitted plane;
- (e3) projecting the uppermost boundary points on the fitted plane to produce projected points;
- (e4) obtaining a corresponding iterative equation according to the fitting type;
- (e5) determining if the number of an iteration reaches a preset integer, and the procedure going directly to block (e8) if the number of the iteration reaches the preset integer, or the procedure going to block (e6) if the number of the iteration does not reach the preset integer;
- (e6) obtaining the number of points used in a current iteration, and calculating an iterative value of the uppermost boundary points or the projected points according to original iterative parameters and the corresponding iterative equation, wherein the original iterative parameters are obtained by the least square method;
- (e7) calculating feature values of a feature element to be fitted according to the iterative value; and
- (e8) fitting the feature element according to the feature values and the fitting type.

5. The method according to claim 4, wherein calculating an iterative value of the uppermost boundary points or the projected points comprises:
- (g0) calculating a function value $f(x)$ of the iterative equation in block (e4);
- (g1) determining if $f(x)$ is less than a predefined value, and the procedure going directly to block (g6) if $f(x)$ is less than the predefined value, or the procedure going to block (g2) if $f(x)$ is greater than or equal to the predefined value;
- (g2) calculating a descent direction of $f(x)$;
- (g3) determining if the descent direction of $f(x)$ exists, and the procedure going directly to block (g6) if the descent direction of $f(x)$ does not exist, or the procedure going to block (g4) if the descent direction of $f(x)$ exists;
- (g4) moving the uppermost boundary points or the projected points by a step D along the descent direction, and calculating a new function value $f(x-1)$ of the iterative equation after the movement of the uppermost boundary points or the projected points;
- (g5) determining if $f(x-1)$ is less than $f(x)$, and the procedure returning to block (g2) if $f(x-1)$ is less than $f(x)$, or the procedure returning to block (g4) if $f(x-1)$ is greater than or equal to $f(x)$, wherein $f(x)$ is replaced by the new function value $f(x-1)$; and
- (g6) outputting the iterative value, wherein the iterative value is the function value $f(x)$.

6. The method according to claim 4, wherein the iterative value in block (e6) is a minimum distance between the uppermost boundary points or the projected points and the feature element to be fitted.

7. The method according to claim 1, wherein the feature element is selected from the group consisting of a line, a plane, a circle, a cylinder, and a sphere.

8. The method according to claim 4, wherein the number of an iteration in step (e5) is three, and the number of points used in a current iteration is determined by: the number of points used in a first iteration being the number of the uppermost boundary points or the projected points multiplied by a first percentage, the number of points used in a second iteration being the number of the uppermost boundary points or the projected points multiplied by a second percentage, and the number of points used in a third iteration is the number of the uppermost boundary points or the projected points.

9. The method according to claim 4, wherein:
- the original iterative parameters comprise coordinates of a start point and an end point upon the condition that the fitting type is a line type;
- the original iterative parameters comprise coordinates of a first central point upon the condition that the fitting type is a circle type;
- the original iterative parameters comprise coordinates of a second central point upon the condition that the fitting type is a sphere type;
- the original iterative parameters comprise coordinates of a start point and an end point of a central axis upon the condition that the fitting type is a cylinder type;
- the original iterative parameters comprise a dimensional position and a normal vector upon the condition that the fitting type is a plane type.

10. A non-transitory storage medium having stored thereon instructions that, when executed by a processor of a computer, cause the processor to perform a method for measuring form and position tolerances of an object, the method comprising:
- (a) receiving an image of a measured object and a preselected feature element to be fitted from the image stored in a storage device;
- (b) dividing the image of the measured object into a plurality of triangular grids, so as to obtain point clouds of the image of the measured object;
- (c) receiving a reference feature element selected from an image of a reference object corresponding to the measured object;
- (d) retrieving uppermost boundary points from the plurality of triangular grids;
- (e) fitting the retrieved uppermost boundary points to a feature element;
- (f) calculating form and position tolerances between the fitted feature element and the reference feature element; and
- (g) outputting an analysis report to show the form and position tolerances on a display device.

11. The non-transitory storage medium according to claim 10, wherein retrieving uppermost boundary points from the triangular grids of the image of the measured object comprises:
- (d1) drawing a closed polygonal chain onto the triangular grids so as to enclose the preselected feature element;
- (d2) obtaining a plurality of points selected from the closed polygonal chain;
- (d3) retrieving uppermost points viewed in front of the display device from the selected points; and
- (d4) determining the uppermost boundary points of the triangular grids by comparing the uppermost points with the boundary points.

12. The non-transitory storage medium according to claim 10, wherein fitting the retrieved uppermost boundary points to a feature element comprises:
- (e0) receiving a fitting type of the preselected feature element;
- (e1) determining if the fitting type is a line type or a circle type, and the procedure going to block (e2) if the fitting type is a line type or a circle type, or the procedure going directly to block (e4) if the fitting type is not a line type or a circle type;
- (e2) fitting the uppermost boundary points to form a fitted plane;
- (e3) projecting the uppermost boundary points on the fitted plane to produce projected points;
- (e4) obtaining a corresponding iterative equation according to the fitting type;
- (e5) determining if the number of an iteration reaches a preset integer, and the procedure going directly to block (e8) if the number of the iteration reaches the preset integer, or the procedure going to block (e6) if the number of the iteration does not reach the preset integer;
- (e6) obtaining the number of points used in a current iteration, and calculating an iterative value of the uppermost boundary points or the projected points according to original iterative parameters and the corresponding iterative equation, wherein the original iterative parameters are obtained by the least square method;
- (e7) calculating feature values of a feature element to be fitted according to the iterative value; and
- (e8) fitting the feature element according to the feature values and the fitting type.

13. The non-transitory storage medium according to claim 12, wherein calculating an iterative value of the uppermost boundary points or the projected points comprises:
- (g0) calculating a function value $f(x)$ of the iterative equation in block (e4);
- (g1) determining if $f(x)$ is less than a predefined value, and the procedure going directly to block (g6) if $f(x)$ is less than the predefined value, or the procedure going to block (g2) if $f(x)$ is greater than or equal to the predefined value;
- (g2) calculating a descent direction of $f(x)$;
- (g3) determining if the descent direction of $f(x)$ exists, and the procedure going directly to block (g6) if the descent direction of $f(x)$ does not exist, or the procedure going to block (g4) if the descent direction of $f(x)$ exists;
- (g4) moving the uppermost boundary points or the projected points by a step D along the descent direction, and calculating a new function value $f(x-1)$ of the iterative equation after the movement of the uppermost boundary points or the projected points;
- (g5) determining if $f(x-1)$ is less than $f(x)$, and the procedure returning to block (g2) if $f(x-1)$ is less than $f(x)$, or the procedure returning to block (g4) if $f(x-1)$ is greater than or equal to $f(x)$, wherein $f(x)$ is replaced by the new function value $f(x-1)$; and
- (g6) outputting the iterative value, wherein the iterative value is the function value $f(x)$.

14. The non-transitory storage medium according to claim 12, wherein the iterative value in block (e6) is a minimum distance between the uppermost boundary points or the projected points and the feature element to be fitted.

15. The non-transitory storage medium according to claim 10, wherein the feature element is selected from the group consisting of a line, a plane, a circle, a cylinder, and a sphere.

16. A computing system for measuring form and position tolerances of an object, comprising:
- a storage device for storing point clouds of an object;
- an obtaining module operable to receive an image of a measured object and a preselected feature element to be fitted from the image stored in the storage device;
- a gridding module operable to divide the image of the measured object into a plurality of triangular grids, so as to obtain point clouds of the image of the measured object;
- the obtaining module further operable to receive a reference feature element selected from an image of a reference object corresponding to the measured object;
- a retrieving module operable to retrieve uppermost boundary points from the plurality of triangular grids;
- a fitting module operable to fit the retrieved uppermost boundary points to a feature element;
- a calculating module operable to calculate form and position tolerances between the fitted feature element and the reference feature element; and
- an outputting module operable to output an analysis report to show the form and position tolerances on a display device.

17. The system according to claim 16, wherein the retrieving module retrieves uppermost boundary points from the triangular grids of the image of the measured object by:
- drawing a closed polygonal chain onto the triangular grids so as to enclose the preselected feature element;
- obtaining a plurality of points selected from the closed polygonal chain;
- retrieving uppermost points viewed in front of the display device from the selected points; and
- determining the uppermost boundary points of the triangular grids by comparing the uppermost points with the boundary points.

18. The system according to claim 16, wherein the fitting module fits the retrieved uppermost boundary points to a feature element by:
- receiving a fitting type of the preselected feature element;
- fitting the uppermost boundary points to form a fitted plane upon the condition that the fitting type is a line type or a circle type, and projecting the uppermost boundary points on the fitted plane to produce projected points;
- obtaining a corresponding iterative equation according to the fitting type;
- if the number of an iteration does not reach a preset integer, obtaining a number of points used in a current iteration, and calculating an iterative value of the uppermost boundary points or the projected points according to original iterative parameters and the corresponding iterative equation, wherein the original iterative parameters are obtained by the least square method;
- calculating feature values of a feature element to be fitted according to the iterative value; and if the number of the iteration reaches the preset integer, fitting the feature element according to the feature values and the fitting type.

19. The system according to claim 18, wherein the fitting module calculates an iterative value of the uppermost boundary points or the projected points by:
- (g0) calculating a function value $f(x)$ of the iterative equation in block (e4);
- (g1) determining if $f(x)$ is less than a predefined value, and the procedure going directly to block (g6) if $f(x)$ is less than the predefined value, or the procedure going to block (g2) if $f(x)$ is greater than or equal to the predefined value;
- (g2) calculating a descent direction of $f(x)$;
- (g3) determining if the descent direction of $f(x)$ exists, and the procedure going directly to block (g6) if the descent direction of $f(x)$ does not exist, or the procedure going to block (g4) if the descent direction of $f(x)$ exists;
- (g4) moving the uppermost boundary points or the projected points by a step D along the descent direction, and calculating a new function value $f(x-1)$ of the iterative equation after the movement of the uppermost boundary points or the projected points;
- (g5) determining if $f(x-1)$ is less than $f(x)$, and the procedure returning to block (g2) if $f(x-1)$ is less than $f(x)$, or the procedure returning to block (g4) if $f(x-1)$ is greater than or equal to $f(x)$, wherein $f(x)$ is replaced by the new function value $f(x-1)$; and
- (g6) outputting the iterative value, wherein the iterative value is the function value $f(x)$.

20. The system according to claim 18, wherein the iterative value is a minimum distance between the uppermost boundary points or the projected points and the feature element to be fitted.

* * * * *